United States Patent
Crowder et al.

(10) Patent No.: US 8,540,807 B2
(45) Date of Patent: Sep. 24, 2013

(54) VENTING AND FILTRATION SYSTEMS WITH GAS PERMEABLE MEMBRANE

(75) Inventors: Robert O. Crowder, Lino Lakes, MN (US); John H. Burban, Lake Elmo, MN (US); Steven T. Jersey, Laguna Niguel, CA (US); Kevin Carlson, Chino Hills, CA (US); Michael Saveliev, Huntington Beach, CA (US)

(73) Assignee: Porous Media Corporation, St. Paul, MN (US)

( * ) Notice: Subject to any disclaimer, the term of this patent is extended or adjusted under 35 U.S.C. 154(b) by 547 days.

(21) Appl. No.: 12/608,880

(22) Filed: Oct. 29, 2009

(65) Prior Publication Data

US 2010/0107878 A1 May 6, 2010

Related U.S. Application Data

(60) Provisional application No. 61/109,859, filed on Oct. 30, 2008.

(51) Int. Cl.
*B01D 53/22* (2006.01)
*B01D 19/00* (2006.01)

(52) U.S. Cl.
USPC ............... 96/6; 95/46; 95/47; 95/54; 55/502

(58) Field of Classification Search
USPC ............... 95/45, 46, 47, 52, 54; 96/4, 6, 11, 96/12; 55/502; 210/640, 321.6
See application file for complete search history.

(56) References Cited

U.S. PATENT DOCUMENTS

| | | | |
|---|---|---|---|
| 2,310,829 A | 2/1943 | Becker |
| 3,229,445 A | 1/1966 | Kraft |
| 3,741,552 A | 6/1973 | Skoli et al. |
| 3,778,971 A | 12/1973 | Granger et al. |
| 3,803,810 A | 4/1974 | Rosenberg |
| 3,854,907 A | 12/1974 | Rising |
| 3,856,483 A | 12/1974 | Rumpf et al. |
| 3,960,066 A | 6/1976 | LaRocco et al. |
| 4,113,627 A | 9/1978 | Leason |
| 4,179,045 A | 12/1979 | Colombani |
| 4,237,526 A | 12/1980 | Wood |
| 4,238,207 A | 12/1980 | Ruschke |
| 4,298,357 A | 11/1981 | Pernic |
| 4,298,358 A | 11/1981 | Ruschke |
| 4,356,012 A | 10/1982 | Hofstetter |
| 4,515,606 A | 5/1985 | de Winter |
| 4,518,403 A | 5/1985 | Hertz |
| 4,571,244 A | 2/1986 | Knighton |
| 4,581,304 A | 4/1986 | Beatty et al. |
| 4,772,390 A | 9/1988 | Kawai et al. |
| 4,882,097 A | 11/1989 | Shannon |
| 4,908,048 A | 3/1990 | Hofmann et al. |
| 4,927,567 A | 5/1990 | Rudick |

(Continued)

FOREIGN PATENT DOCUMENTS

| | | |
|---|---|---|
| EP | 0973031 | 1/2000 |
| EP | 0791383 | 6/2003 |

*Primary Examiner* — Jason M Greene
(74) *Attorney, Agent, or Firm* — Quarles & Brady LLP

(57) ABSTRACT

Embodiments of the invention provide venting and filtration systems with a membrane that is permeable to gas and substantially impermeable liquid. The systems can remove a gas from a liquid entrained with gas. The systems can include a reservoir in fluid communication with the membrane and a liquid outlet. The membrane can help prevent the gas from reaching the liquid outlet.

8 Claims, 9 Drawing Sheets

(56) References Cited

U.S. PATENT DOCUMENTS

| | | | |
|---|---|---|---|
| 4,954,002 A | 9/1990 | Wallis et al. | |
| 5,000,351 A | 3/1991 | Rudick | |
| 5,078,755 A * | 1/1992 | Tozawa et al. | 95/46 |
| 5,123,937 A | 6/1992 | Shibata et al. | |
| 5,183,486 A | 2/1993 | Gatten et al. | |
| 5,256,279 A | 10/1993 | Voznick et al. | |
| 5,279,647 A | 1/1994 | Gatten et al. | |
| 5,288,308 A | 2/1994 | Puri et al. | |
| 5,290,340 A | 3/1994 | Gatten et al. | |
| 5,329,889 A | 7/1994 | Caldwell | |
| 5,409,515 A | 4/1995 | Yamamoto et al. | |
| 5,425,803 A | 6/1995 | van Schravendijk et al. | |
| 5,522,769 A | 6/1996 | DeGuiseppi | |
| 5,565,149 A | 10/1996 | Page et al. | |
| 5,623,390 A | 4/1997 | Noda et al. | |
| 5,645,625 A | 7/1997 | vanSchravendijk et al. | |
| 5,670,094 A | 9/1997 | Sasaki et al. | |
| 5,695,545 A | 12/1997 | Cho et al. | |
| 5,711,882 A * | 1/1998 | Hofmann et al. | 95/45 |
| 5,772,736 A | 6/1998 | vanSchravendijk et al. | |
| 5,779,674 A | 7/1998 | Ford | |
| 5,860,737 A | 1/1999 | Hauser | |
| 5,888,275 A | 3/1999 | Hamasaki et al. | |
| 5,927,099 A | 7/1999 | Bosko | |
| 6,086,770 A | 7/2000 | Matkovich | |
| 6,138,995 A | 10/2000 | Page | |
| 6,142,748 A | 11/2000 | Harris et al. | |
| 6,158,721 A | 12/2000 | Katon et al. | |
| 6,209,541 B1 * | 4/2001 | Wallace | 55/511 |
| 6,267,926 B1 | 7/2001 | Reed et al. | |
| 6,309,444 B1 | 10/2001 | Sims et al. | |
| 6,315,815 B1 * | 11/2001 | Spadaccini et al. | 95/46 |
| 6,355,292 B1 | 3/2002 | Cheng et al. | |
| 6,500,242 B2 | 12/2002 | Fu | |
| 6,503,225 B1 | 1/2003 | Kirsch et al. | |
| 6,558,450 B2 * | 5/2003 | Sengupta et al. | 95/46 |
| 6,638,426 B1 | 10/2003 | Fritter et al. | |
| 6,648,945 B1 | 11/2003 | Takeda et al. | |
| 6,712,342 B2 | 3/2004 | Bosko | |
| 6,746,514 B2 * | 6/2004 | Bedingfield et al. | 95/46 |
| 6,776,301 B2 | 8/2004 | Torres-White et al. | |
| 6,860,922 B2 * | 3/2005 | Watari et al. | 96/6 |
| 7,018,032 B2 | 3/2006 | Merz et al. | |
| 7,097,690 B2 | 8/2006 | Usher et al. | |
| 7,104,531 B2 | 9/2006 | Page et al. | |
| 7,144,442 B2 * | 12/2006 | Hayashi | 96/6 |
| 7,238,224 B2 * | 7/2007 | Kent | 95/46 |
| 7,267,247 B1 | 9/2007 | Crunkleton, III et al. | |
| 7,279,031 B1 * | 10/2007 | Wright | 96/6 |
| 8,080,093 B2 * | 12/2011 | Ito et al. | 96/6 |
| 2003/0046914 A1 * | 3/2003 | Zia et al. | 55/502 |
| 2003/0192428 A1 * | 10/2003 | Cheng et al. | 95/46 |
| 2006/0137526 A1 * | 6/2006 | Ueda | 96/6 |
| 2006/0185510 A1 | 8/2006 | Sloan | |
| 2006/0288870 A1 * | 12/2006 | Kang et al. | 96/6 |
| 2007/0180992 A1 | 8/2007 | Kang et al. | |
| 2007/0278145 A1 * | 12/2007 | Taylor et al. | 96/6 |
| 2007/0295662 A1 | 12/2007 | Park et al. | |
| 2008/0142441 A1 | 6/2008 | Pashley | |
| 2008/0184683 A1 | 8/2008 | Clarke et al. | |

* cited by examiner

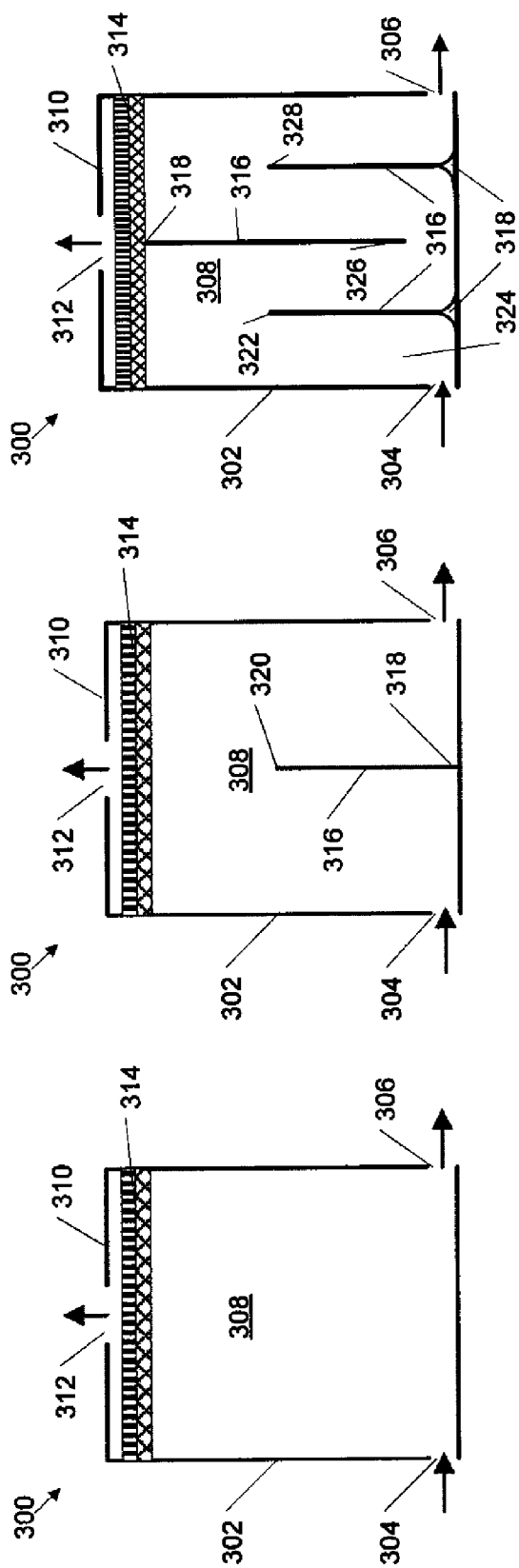

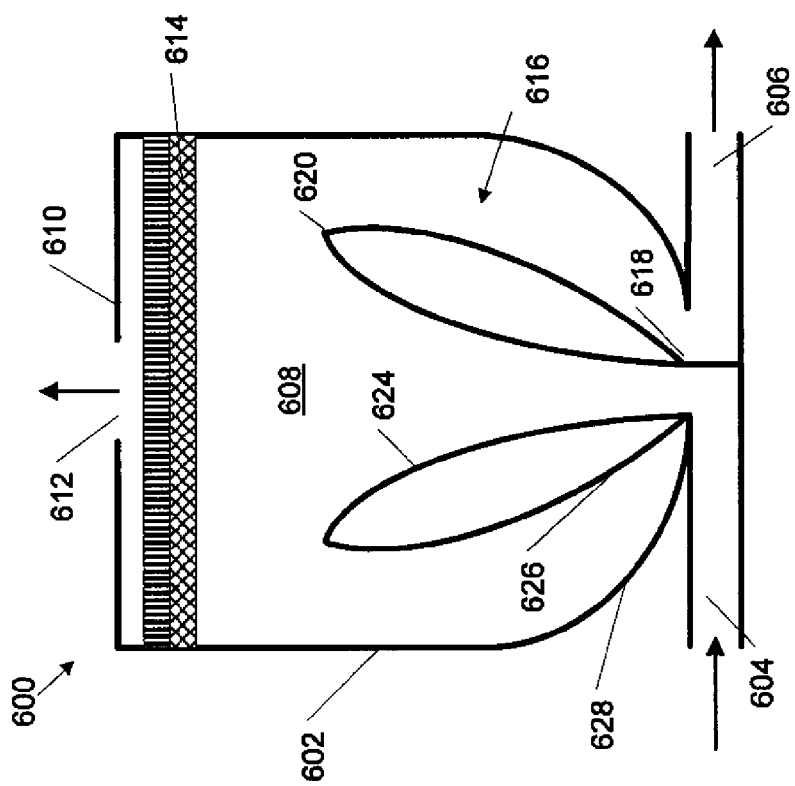
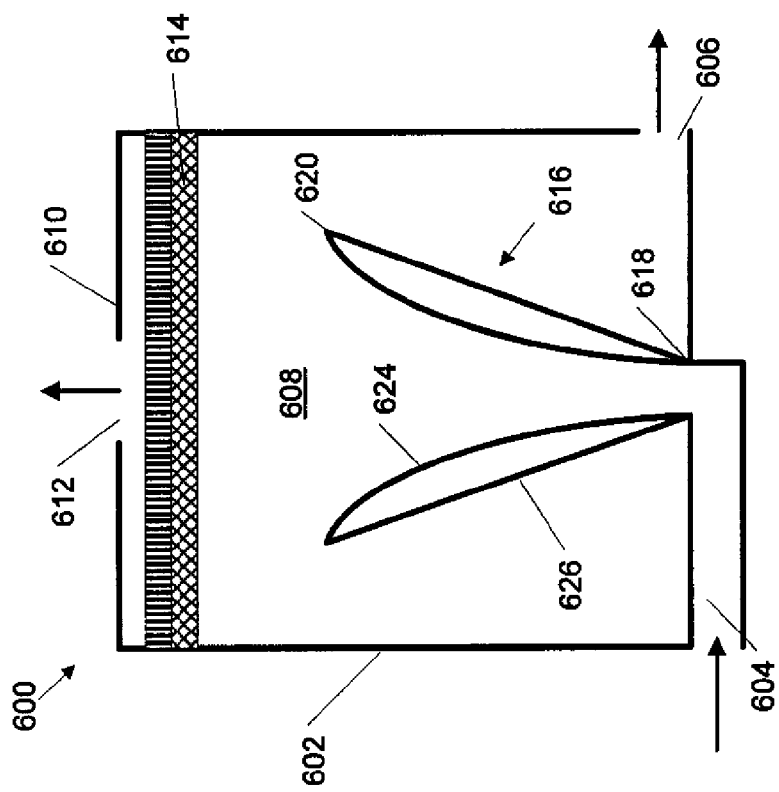

VENTING AND FILTRATION SYSTEMS WITH GAS PERMEABLE MEMBRANE

RELATED APPLICATIONS

This application claims priority under 35 U.S.C. §119 to U.S. Provisional Patent Application No. 61/109,859 filed on Oct. 30, 2008, the entire contents of which is incorporated herein by reference.

BACKGROUND

Air or other gases dissolved or otherwise trapped in liquids are known to cause problems in liquid supply systems, such as mixing systems and filtration systems. Entrapped gas can decrease the performance of the filtration system. For example, air and other gases separated from the liquid within the filtration system can result in an uneven loading of a filter and can reduce a flow rate through the filtration system. In a mixing system, entrapped gas may not only be undesirable, but can also be harmful to equipment in the mixing system. Thus, it is desirable to remove air and other gases from the liquid to reduce or minimize such harmful effects.

Hydrocarbons, such as motor oils, automatic transmission fluids, and liquid food products, are a complex mixture of chemicals and additives. If a microporous membrane is used to remove a gas from a stream of hydrocarbons, the various molecular sizes, surface tensions, and other properties of the chemicals and additives can result in clogging of the pores of the membrane and can result in some components of the hydrocarbons wetting and flowing through the membrane.

SUMMARY

Some embodiments of the invention provide a filtration system that filters liquids entrained with gas. The filtration system can include a housing with a reservoir. A filter can be positioned in the reservoir and can divide the reservoir into an upstream chamber and a downstream chamber. A non-porous membrane can be in fluid communication with the upstream chamber. The non-porous membrane can be permeable to gas in order to vent gas from the reservoir. In some embodiments, the membrane can be porous or non-porous and can be permeable to the gas in order to allow the gas to flow from the upstream chamber to the downstream chamber.

Some embodiments of the invention provide a venting system that vents gas from liquid entrained with gas. The venting system can include a housing with a reservoir. The reservoir can include a fluid inlet, a gas outlet, and a liquid outlet. The venting system can also include a non-porous membrane in fluid communication with the reservoir and the gas outlet. The non-porous membrane can be permeable to the gas and substantially impermeable to the liquid. In some embodiments, the membrane can be porous or non-porous and a weir can be positioned within the reservoir. The weir can be in fluid communication with the fluid inlet.

DESCRIPTION OF THE DRAWINGS

FIG. 4A is a cross-sectional schematic view of a venting system according to one embodiment of the invention.

FIG. 4B is a cross-sectional schematic view of the venting system of FIG. 4A including a baffle according to one embodiment of the invention.

FIG. 4C is a cross-sectional schematic view of the venting system of FIG. 4A including a plurality of baffles according to one embodiment of the invention.

FIG. 6A is a cross-sectional schematic view of a venting system including a weir having a curved inner wall according to one embodiment of the invention.

FIG. 6B is a cross-sectional schematic view of a venting system including a weir having a curved inner wall and a curved outer wall according to one embodiment of the invention.

DETAILED DESCRIPTION

Figure 1B:
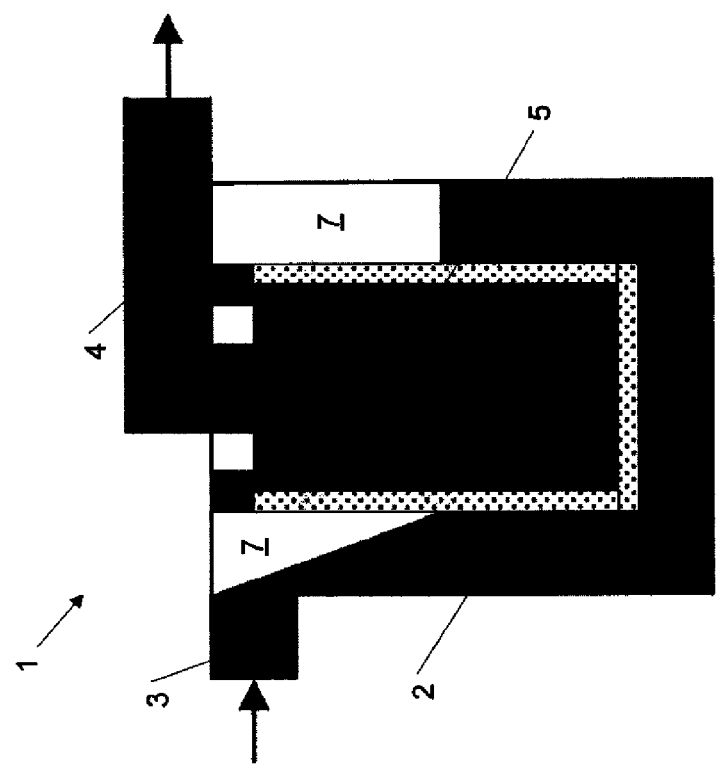
FIG. 1B is a cross-sectional schematic view of a fluid flowing through the prior art filtration device of FIG. 1A.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

The following discussion is presented to enable a person skilled in the art to make and use embodiments of the invention. Various modifications to the illustrated embodiments will be readily apparent to those skilled in the art, and the generic principles herein can be applied to other embodiments and applications without departing from embodiments of the invention. Thus, embodiments of the invention are not intended to be limited to embodiments shown, but are to be accorded the widest scope consistent with the principles and features disclosed herein. The following detailed description is to be read with reference to the figures, in which like elements in different figures have like reference numerals. The figures, which are not necessarily to scale, depict selected embodiments and are not intended to limit the scope of embodiments of the invention. Skilled artisans will recognize the examples provided herein have many useful alternatives and fall within the scope of embodiments of the invention.

Figure 1A:
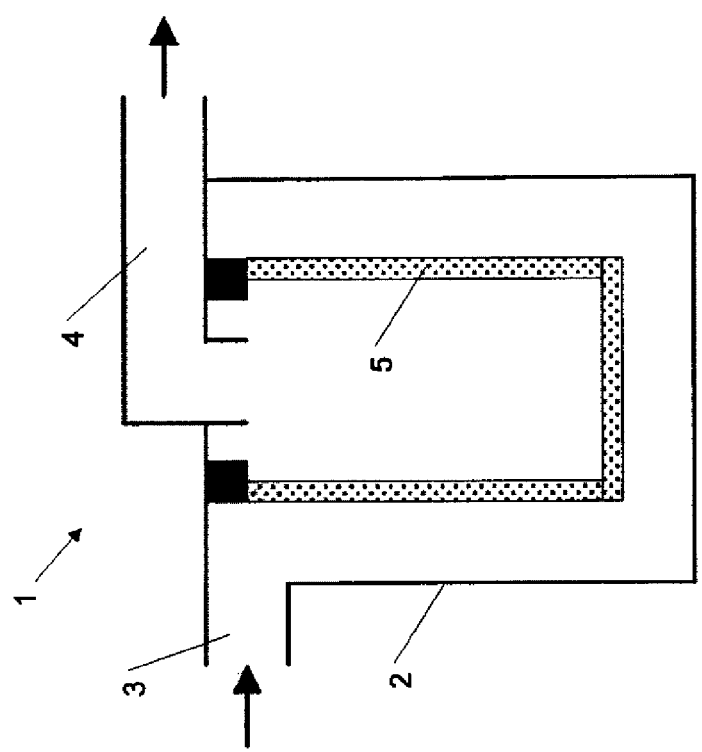
FIG. 1A is a cross-sectional schematic view of a prior art filtration device according to one embodiment of the invention.

FIGS. 1A and 1B illustrate a prior art filter device 1 used in filtration applications. The filter device 1 can include a filter housing 2 having an inlet 3 and an outlet 4. The filter housing 2 can support a filter 5. As shown in FIG. 1B, a fluid can enter the filter housing 2 through the inlet 3, can flow through the filter 5, and can exit the outlet 4. The fluid can include a liquid 6 and a gas 7. As the fluid is introduced through the inlet 3, it begins to wet and permeate the filter 5. Once the filter 5 becomes completely wetted, the gas 7 that is separated from the liquid 6 will not permeate the filter 5 and can become trapped within the filter housing 2. The gas 7 can include air and other gases. The gas 7 can impede the liquid 6 from reaching portions of the filter 5 and can prevent the liquid 6 from being fully distributed around the filter 5 during the filtration process. As a result, filtration through the filter 5 can be essentially concentrated in certain portions of the filter 5, while other portions of the filter 5 can remain unused. The life of the filter 5 is reduced, because the filter 5 must be replaced when any portion of the filter becomes expended or clogged, or the pressure drop becomes too large.

Figure 2A:
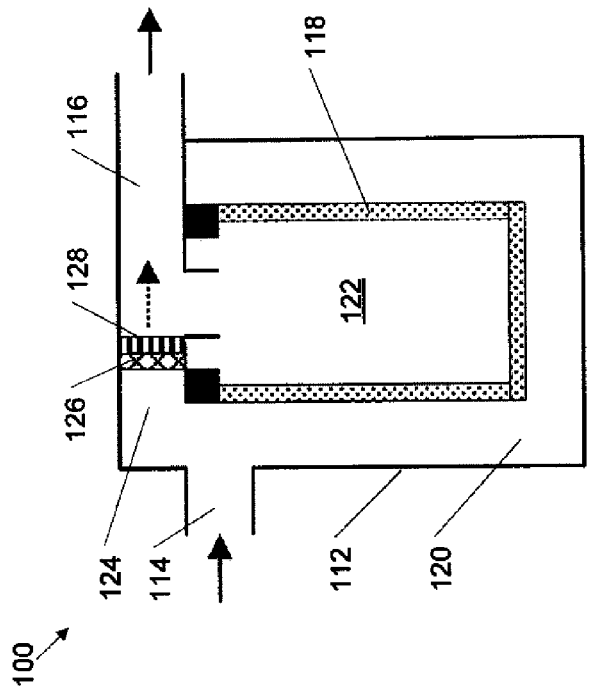
FIG. 2A is a cross-sectional schematic view of a filtration device capable of venting a gas to an ambient environment according to one embodiment of the invention.

FIG. 2A illustrates a filtration device 10 according to one embodiment of the invention. The filtration device 10 can include a housing 12 having a fluid inlet 14 and a liquid outlet 16. The housing 12 can support a filter 18. In some embodiments, the filter 18 can at least partly block a gas from permeating through it. The filter 18 can divide the housing 12 into an upstream chamber 20 and a downstream chamber 22. A fluid can be supplied to the upstream chamber 20 through the fluid inlet 14. The fluid can pass through the filter 18 into the downstream chamber 22. In some embodiments, the filter 18 can be porous and constructed of a suitable material or combination of materials. In other embodiments, the filter 18 can be non-porous and constructed of a suitable material or combination of materials. The liquid outlet 16 can be coupled to the housing 12 to receive the filtered fluid from the downstream chamber 22. The liquid outlet 16 can be coupled to other devices or can supply the filtered fluid directly to an end usage point.

In some embodiments, the housing 12 can further include a gas outlet 24. The gas outlet 24 can be in fluid communication with the upstream chamber 20. The gas outlet 24 can include a membrane 26 configured to permit a gas to pass through it but not the fluid. In some embodiments, the membrane 26 can be porous, hydrophobic, and/or oleophobic. The membrane 26 can be made from polymers, such as Teflon (PTFE), polypropylene, polyethylene, and other suitable materials. In other embodiments, the membrane 26 can be non-porous and can be constructed of a suitable material or combination of materials. In one embodiment, the membrane 26 can be made from a thermoset polymer. In some embodiments, the membrane 26 can include two or more layers of different or similar characteristics, including a support layer 28 to provide the membrane 26 with suitable rigidity. The membrane 26 can further include additional membranes and/or support layers, including porous, microporous and non-porous layers. While the above embodiment defines the chamber 20 as the upstream side of the filter 18 and being in fluid communication with the fluid inlet 14 and defines the chamber 22 being the downstream side of the filter 18 and in fluid communication with the liquid outlet 16, this does not have to be so. In some embodiments, the direction of liquid flow may be from the chamber 22 through the membrane 18 to the chamber 20, where the chamber 22 would then be the upstream side and be in fluid communication with the fluid inlet 14 and the gas outlet 24.

In some embodiments, a gas entrained in the fluid entering the housing 12 through the fluid inlet 14 can be separated from the fluid, for example by the filter 18. In some embodiments, the upstream chamber 20 can be designed to collect the gas at the gas outlet 24. The gas can pass through the membrane 26 and can be released or "vented" to the outside ambient environment. In some embodiments, the membrane 26 can be part of the housing 12. In some embodiments, the membrane 26 can at least partially define the upstream chamber 20. The membrane 26 can prevent the gas from interfering with the filtration process. As a result, substantially the entire filter 18 can be more uniformly used by the fluid.

Figure 2B:
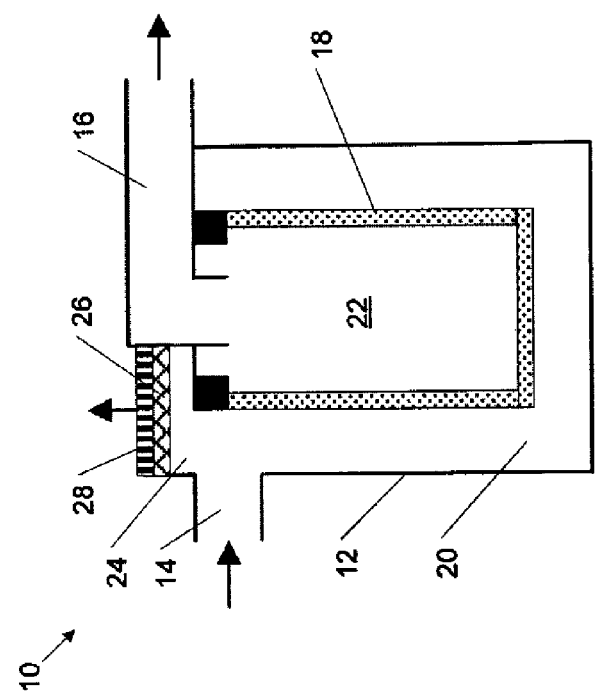
FIG. 2B is a cross-sectional schematic view of a filtration device capable of venting a gas back into a fluid stream, while not allowing liquid to bypass the filtration device, according to one embodiment of the invention.

FIG. 2B illustrates a filtration device 100 according to another embodiment of the invention. The filtration device 100 can be similar to the filtration device 10. The filtration device 100 can include a housing 112 having a fluid inlet 114 and a liquid outlet 116. The housing 112 can support a filter 118. The filter 118 can divide the housing 112 in an upstream chamber 120 and a downstream chamber 122. A fluid can be supplied to the upstream chamber 120 through the fluid inlet 114. The fluid can pass through the filter 118 into the downstream chamber 122. In some embodiments, the filter 118 can be porous and constructed of a suitable material or combination of materials. In other embodiments, the filter 118 can be non-porous and constructed of a suitable material or combination of materials. The liquid outlet 116 can be coupled to the housing 112 to receive the filtered fluid from the downstream chamber 122 and to direct the filtered fluid from the filtration device 100.

In some embodiments, the housing 112 can further include a gas outlet 124. The gas outlet 124 can be in fluid communication with the upstream chamber 120. The gas outlet 124 can include a membrane 126 configured to permit a gas to pass through it but not the fluid. The membrane 126 can include two or more layers of different or similar characteristics, including a support layer 128 to provide the membrane 126 with suitable rigidity. In some embodiments, the membrane 126 can be substantially similar to the membrane 26.

In some embodiments, a gas entrained in the fluid entering the housing 112 through the fluid inlet 114 can be separated from the fluid, for example by the filter 118. In some embodiments, the upstream chamber 120 can be designed to collect the gas at the gas outlet 124. The gas can pass through the membrane 126 and can be released to the liquid outlet 116 and/or the downstream chamber 122. The membrane 126 can help prevent the gas from interfering with the filtration process. As a result, substantially the entire filter 118 can be used more uniformly by the fluid.

In some embodiments, the filtration device 100 can be used if none of the gas can be released to the ambient environment, for example, if the gas is hazardous and/or otherwise violates local, state, and federal codes. In other embodiments, the filtration device 100 can be used if an objective of the filtration application is to remove particulate from the fluid without removing entrained gases. The filter 118 can separate the entrained gas from the fluid. The gas can be collected by the gas outlet 124. The membrane 126 can allow the gas to rejoin the fluid downstream of the filter 118 so that the filter 118 only removes particulate without removing substantially any gases. In some embodiments, the filtration device 100 can be used to filter carbonated water.

Figure 3A:
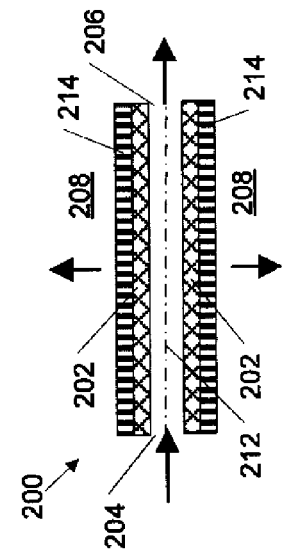
FIG. 3A is a cross-sectional schematic view of a venting system according to one embodiment of the invention.
Figure 3B:
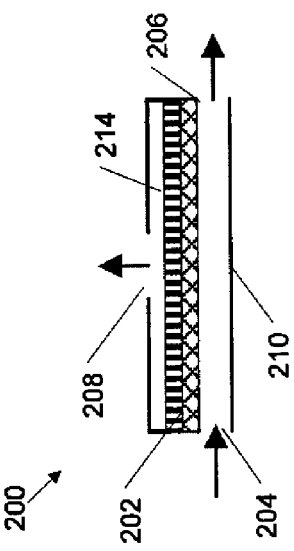
FIG. 3B is a cross-sectional schematic view of a venting system according to another embodiment of the invention.

FIGS. 3A and 3B illustrate a venting system 200 including a membrane 202. The venting system 200 can include a fluid inlet 204, a liquid outlet 206, and a gas outlet 208. The membrane 202 can separate an entrained gas from a fluid entering the venting system 200 through the fluid inlet 204. The gas can be dissolved or otherwise entrapped in the fluid. The membrane 202 can help prevent the liquid from reaching the gas outlet 208.

As shown in FIG. 3A, the venting system 200 can include a housing 210. The housing 210 can include the fluid inlet 204, the liquid outlet 206, and the gas outlet 208. The housing 210 can enclose the membrane 202. In some embodiments, the membrane 202 can be substantially planar. As shown in FIG. 3B, the venting system 200 can be symmetric to an axis and/or a plane 212. In some embodiments, the membrane 202 can be circular or can include at least two opposing membranes 202. In some embodiments, the membrane 202 can include a support layer 214, which can be sufficiently strong to support the membrane 202 without the presence of the housing 210, in some embodiments.

FIG. 4A illustrates a venting system 300 according to one embodiment of the invention. The venting system 300 can include a housing 302, a fluid inlet 304, and a liquid outlet 306. The housing 302 can include an upper cavity or reservoir 308. In some embodiments, the reservoir 308 can be impermeable on all sides except for an upper portion 310. The upper portion 310 can include a gas outlet 312 and a membrane 314. In some embodiments, the membrane 314 can be positioned at any suitable location within the reservoir 308. In some embodiments, the membrane 314 can at least partly define the reservoir 308. The membrane 314 can be substantially similar to the membrane 26, the membrane 126, and/or the membrane 202.

In operation, a fluid can enter the reservoir 308 through the fluid inlet 304 and can exit through the liquid outlet 306. While passing through the housing 302 and/or the reservoir 308, a gas entrained in the fluid can be collected within the reservoir 308. The gas within the reservoir 308 can remain in contact with the membrane 314 until permeating through it to the gas outlet 312, which can be of a suitable size.

In some embodiments, the reservoir 308 can help the gas separate from the fluid. The time the fluid can remain in the reservoir 308 can be determined by the size of the reservoir 308. The reservoir 308 can substantially prevent the gas from reaching the liquid outlet 306, thereby ensuring that the gas can accumulate at the membrane 314. In some embodiments, the time the gas can be in contact with the membrane 314 before permeating through it, can be substantially longer than a flow-through time of the fluid through the venting system 300. In some embodiments, the membrane 314 can be non-porous. In some embodiments, the membrane 314 can include thermoset polymers.

While porous membranes have been used for venting a gas from a liquid stream, this proves inadequate for many venting applications. If the liquid being vented is a complex liquid containing low surface tension components, or surfactants, the pores of a porous membrane will become wetted, and the liquid will flow through. Likewise, if the device is used for a long period of time, even with simple high surface tension liquids, temperature fluctuations may cause evaporation and condensation within the pores of the membrane, causing wetting, and eventual liquid flow through. Using a non-porous material for the membrane 314 means that the membrane 314 can never become wetted, even over long periods of time and with complex liquids. Using a non-porous material for the membrane 314 means that the device can be constructed with a large reservoir 308 to hold the separated gas until it permeates through the membrane 314, since non-porous membranes will have a much lower gas transmission rate. Likewise, the venting system 300 can be constructed with significantly more area for the membrane 314 to accommodate the lower gas transmission rate.

FIG. 4B illustrates the venting system 300 including a baffle 316 according to one embodiment of the invention. The baffle 316 can protrude into the reservoir 308. The baffle 316 can create a tortuous flow path allowing centrifugal forces and/or buoyancy forces to act on the fluid. The baffle 316 can include a lower end 318 and an upper end 320.

The baffle 316 can have a suitable geometrical shape, including rectangular and cylindrical shapes. In some embodiments, the baffle 316 can be coupled to at least two sides of the reservoir 308 so that the fluid entering the venting system 300 can be forced to flow over the upper end 320 before exiting the venting system 300 through the liquid outlet 306. As a result, the minimum fluid flow-through time can be prolonged, even though the average flow-through time remains unchanged. The longer fluid retention within the housing 302 can increase the likelihood of the entrained gas being released within the reservoir 308 and eventually permeating through the membrane 314. Other configurations forming tortuous flow paths can be used rather than the baffle 316.

FIG. 4C illustrates the venting system 300 including three baffles 316 according to one embodiment of the invention. A first baffle 322 can be coupled to a bottom of the reservoir 308. In some embodiments, the lower end 318 of the first baffle 322 can promote fluid flow along the first baffle 322. In one embodiment, the lower end 318 of the first baffle 322 can be curved. The first baffle 322 and a portion of the housing 302 can form a channel 324. In some embodiments, a distance from the upper end 320 of the first baffle 322 to the membrane 314 can be substantially larger than the width of the channel 324. As a result, the collected gas can remain in contact with the membrane 314 until permeated therethrough substantially without interfering with the flow rate of the fluid through the venting system 300.

In some embodiments, a second baffle 326 can be coupled to the upper portion 310 of the reservoir 308. In some embodiments, a support structure (e.g., a beam) can couple the end 318 of the second baffle 326 to the upper portion 310. In some embodiments, the end 318 of the second baffle 326 can be adjacent to the membrane 314. The end 320 of the second baffle 326 can be directed toward the bottom of the reservoir 308. The baffles 316 can be the same length or different lengths. The end 318 of the second baffle 326 can be designed to help trap the separated gas in the vicinity of the membrane 314. As a result, the time the gas has to permeate the membrane 314 can be increased. In some embodiments, a distance between the end 320 of the second baffle 326 and the bottom of the reservoir 308 can be related to the width of the channel 324. In some embodiments, a third baffle 328 can have the same length or a different length than the first baffle 322 and/or the second baffle 326.

Figure 5B:
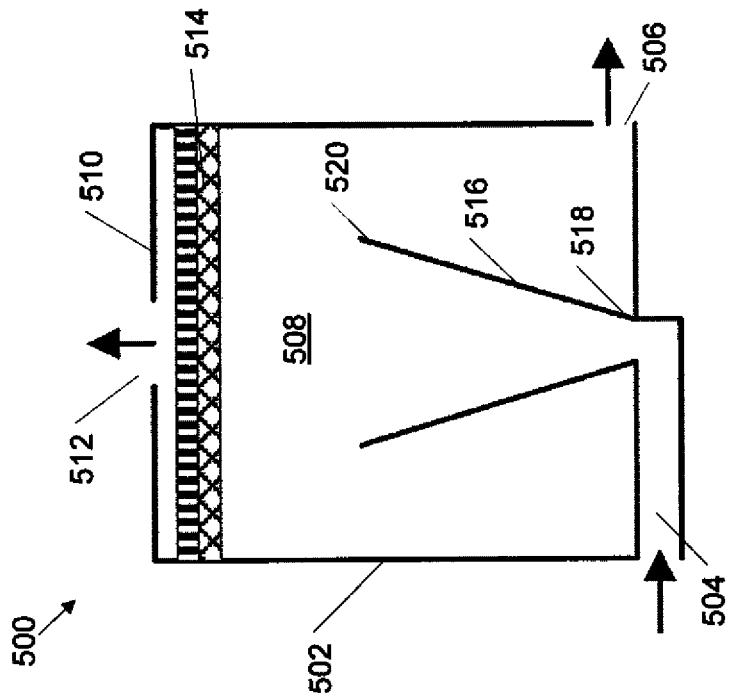
FIG. 5B is a cross-sectional schematic view of a venting system including a weir having a variable cross-sectional area according to one embodiment of the invention.
Figure 5A:
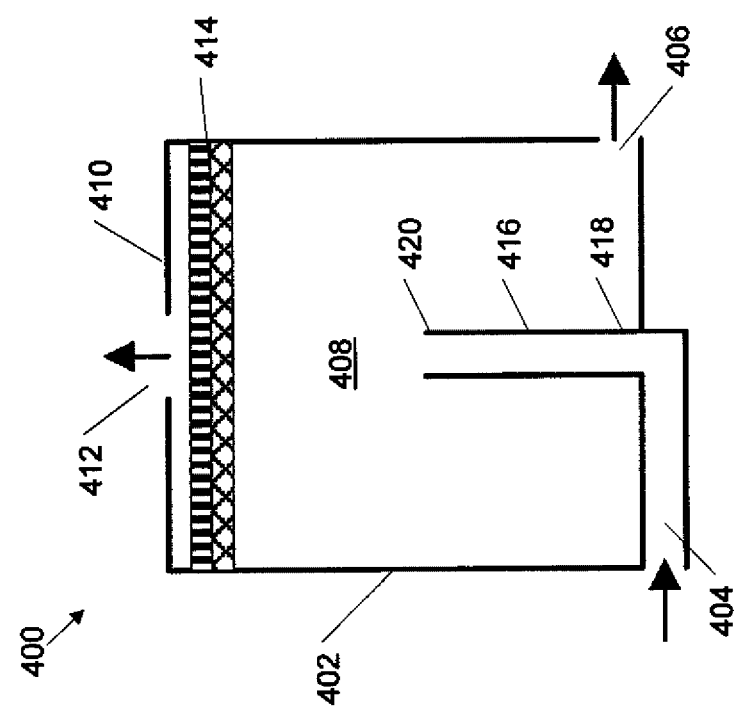
FIG. 5A is a cross-sectional schematic view of a venting system including a weir having a substantially constant cross-sectional area according to one embodiment of the invention.

FIG. 5A illustrates a venting system 400 according to another embodiment of the invention. The venting system 400 can include a housing 402, a fluid inlet 404, a liquid outlet 406, and a reservoir 408. In some embodiments, the reservoir 408 can be impermeable on all sides except for an upper portion 410. The upper portion 410 can include a gas outlet 412 and a membrane 414. The membrane 414 can be substantially similar to the membrane 314. In some embodiments, the membrane 414 can be non-porous.

In some embodiments, the fluid inlet 404 can be in fluid communication with a weir 416. In other embodiments, the fluid inlet 404 can protrude into the reservoir 408 integrally forming the weir 416. The weir 416 can be elongated in shape and can have a cross section that is quadratic, rectangular, hexagonal, circular, oval, or another suitable geometric shape. In some embodiments, the cross section of weir 416 can complement a cross section of the housing 402. In other embodiments, the cross-sectional shape of the weir 416 and the housing 402 can be different. The weir 416 can include a lower end 418 and an upper end 420. In some embodiments, a cross-sectional area of the lower end 418 can be substantially equal to a cross-sectional area of the upper end 420. In some embodiments, the fluid inlet 404 can be fluidly connected to the lower end 418.

A fluid entering the housing 402 through the fluid inlet 404 can be directed to the weir 416. In some embodiments, the flow direction of the fluid within the weir 416 can be against gravity. The fluid can reach the upper end 420 and can overflow from the weir 416 into the reservoir 408. In some embodiments, the fluid can be released from the weir 416 into the reservoir 408 before exiting through the liquid outlet 406. Entrained gas released from the fluid can contact the membrane 414 and can eventually permeate to the gas outlet 412.

FIG. 5B illustrates a venting system 500 according to another embodiment of the invention. The venting system 500 can include a housing 502, a fluid inlet 504, a liquid outlet 506, and a reservoir 508. In some embodiments, the reservoir 508 can be impermeable on all sides except for an upper portion 510. The upper portion 510 can include a gas outlet 512 and a membrane 514. The venting system 500 can be similar to the venting system 400, and the membrane 514 can be substantially similar to the membrane 414. In some embodiments, the membrane 514 can be non-porous.

In some embodiments, the venting system 500 can include a weir 516 having a lower end 518 and an upper end 520. The fluid inlet 504 can be fluidly coupled to the lower end 518. In some embodiments, the lower end 518 can have a smaller cross-sectional area than the upper end 520. As a result, the fluid entering the weir 516 through the inlet 504 can be decelerated while flowing through the weir 516. In some embodiments, the weir 516 can be substantially conical. In some embodiments, the weir 516 can increase a flow-through time of the fluid in order to enhance a gas separation from the fluid. Entrapped gas can have more time to coalesce and can be collected by the membrane 514. In some embodiments, a vertical velocity of the fluid flowing through the weir 516 can be slower than a velocity of the separated gas. In some embodiments, the fluid entering the weir 516 can rise to the upper end 520. In other embodiments, the fluid entering the weir 516 can swirl.

In some embodiments, the ratio of cross-sectional areas of the upper end 520 to the lower end 520 can be adjusted according to the properties of the fluid and flow rate. For example, if the venting system 500 is used to extract air from food products, such as syrup or ketchup, the ratio of the cross-sectional areas of the upper end 520 to the lower end 518 can be higher than the ratio of the cross-sectional areas of the upper end 520 to the lower end 518 for aqueous fluid streams.

Figure 5D:
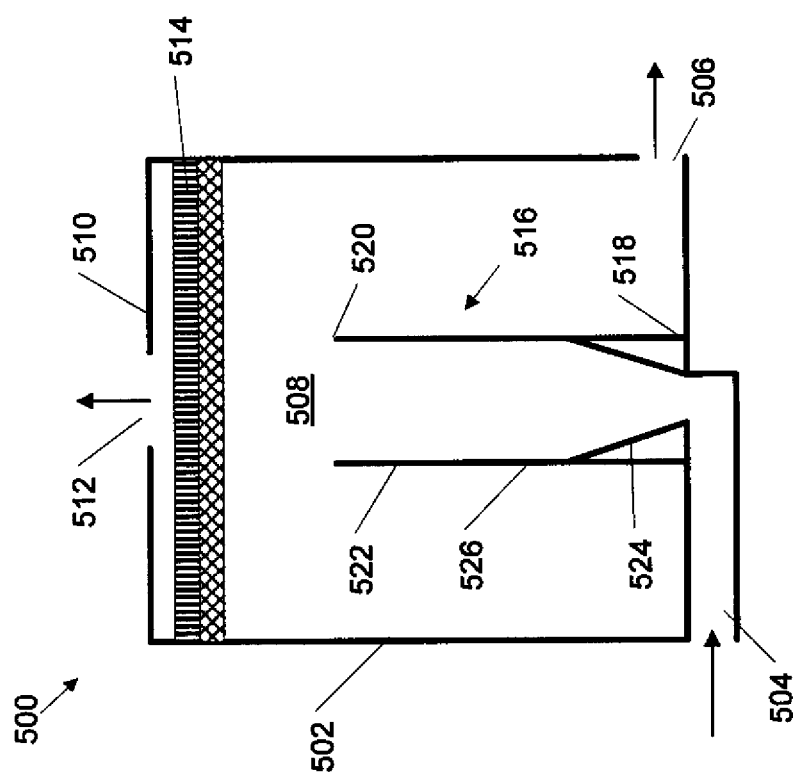
FIG. 5D is a cross-sectional schematic view of a venting system including a weir having a substantially constant cross-sectional area downstream of a variable cross-sectional area according to one embodiment of the invention.
Figure 5C:
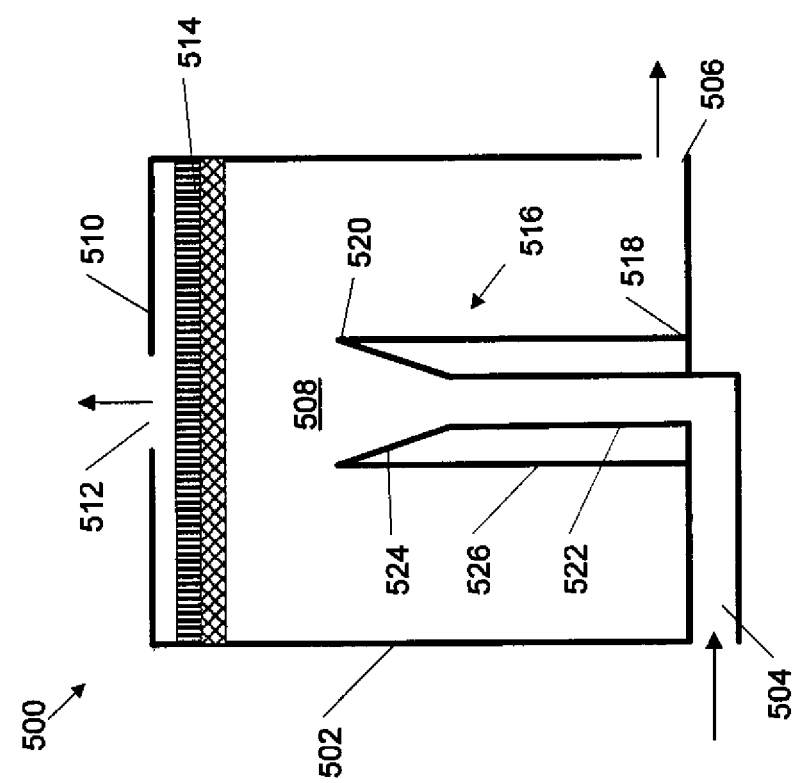
FIG. 5C is a cross-sectional schematic view of a venting system including a weir having a substantially constant cross-sectional area upstream of a variable cross-sectional area according to one embodiment of the invention.

FIGS. 5C and 5D illustrate the venting system 500 according to other embodiments of the invention. The weir 516 can include a substantially straight portion 522, a gradually expanding portion 524, and an outer surface 526. In some embodiments, the gradually expanding portion 524 can act as a diffuser. In some embodiments, the outer surface 526 can be substantially straight. In other embodiments, the outer surface 526 can correspond to a shape of the reservoir 508. The outer surface 526 can help direct fluid flow toward the liquid outlet 506. In some embodiments, the fluid entering the venting system 500 can overflow the weir 516 and can be guided to the liquid outlet 506 by the outer surface 526.

As shown in FIG. 5C, the straight portion 522 can be positioned upstream of the gradually expanding portion 524. In some embodiments, a cross-sectional area of the straight portion 522 can be substantially equal to the smallest cross-sectional area of the gradually expanding portion 524. In one embodiment, the transition from the substantially straight portion 522 to the gradually expanding portion 524 can be smooth. Alternatively, as shown in FIG. 5D, the gradually expanding portion 524 can be positioned upstream of the substantially straight portion 522. In some embodiments, the cross-sectional area of the straight portion 522 can be substantially equal to the largest cross-sectional area of the gradually expanding portion 524. In some embodiments, the weir 516 can include a converging portion and/or a rapid change in cross-sectional area, such as one or more steps (not shown).

FIG. 6A illustrates a venting system 600 according to one embodiment of the invention. The venting system 600 can include a housing 602, a fluid inlet 604, a liquid outlet 606, and a reservoir 608. The housing 602 can enclose the reservoir 608. The housing 602 can include an upper portion 610 having a gas outlet 612. The housing 602 can be impermeable to the fluid flowing through the venting system 600 except at the gas outlet 612. A membrane 614 can be positioned within the reservoir 608. The membrane 614 can be adjacent to the gas outlet 612. The fluid entering the venting system 600 can come into contact with the membrane 614. The membrane 614 can be substantially similar to the membrane 514. In some embodiments, the membrane 614 can allow a gas entrapped within the fluid to permeate through to the gas outlet 612, while substantially preventing other components of the fluid from reaching the gas outlet 612.

As shown in FIG. 6A, the venting system 600 can include a weir 616 having a lower end 618 and an upper end 620. The weir 616 can further include an inner surface 624 and an outer surface 626. In some embodiments, the inner surface 624 can be curved between the lower end 618 and the upper end 620. The inner surface 624 can include convex curvature and/or concave curvature. In some embodiments, a cross-sectional area of the lower end 618 can be smaller than a cross-sectional area of the upper end 620. In some embodiments, the inner surface 624 can form a diffuser. In some embodiments, the inner surface 624 can be flared. In some embodiments, the inner surface 624 can be shaped similar to a trumpet funnel. In some embodiments, the outer surface 626 can be conical.

FIG. 6B illustrates the venting system 600 according to another embodiment of the invention. The weir 616 can include the inner surface 624 and the outer surface 626. The outer surface 626 can be curved between the lower end 618 and the upper end 620. In some embodiments, the thickness of the weir 616 can vary between the lower end 618 and the upper end 620 (e.g., the weir 616 can have a petal shape as shown in FIG. 6B). In some embodiments, the upper end 620 can be designed to help prevent a fluid separation region when the fluid is flowing over the weir 616.

The reservoir 608 can include an inner wall 628. As shown in FIG. 6B, the inner wall 628 can be curved. In some embodiments, the curvature of the inner wall 628 can complement the curvature of the outer surface 626 of the weir 616. In some embodiments, the inner wall 628 can help direct fluid flow toward the liquid outlet 606. In some embodiments, the liquid outlet 606 can be fluidly coupled to the reservoir 608 at the lowest point of the reservoir 608. In some embodiments, the liquid outlet 606 can be positioned adjacent the fluid inlet 604. In some embodiments, the weir 616 can be centrally positioned within the reservoir 608. In other embodiments, the liquid outlet 606 can be centrally positioned within the reservoir 608 and the weir 616 can be positioned off to one side of the liquid outlet 606.

Figure 7:
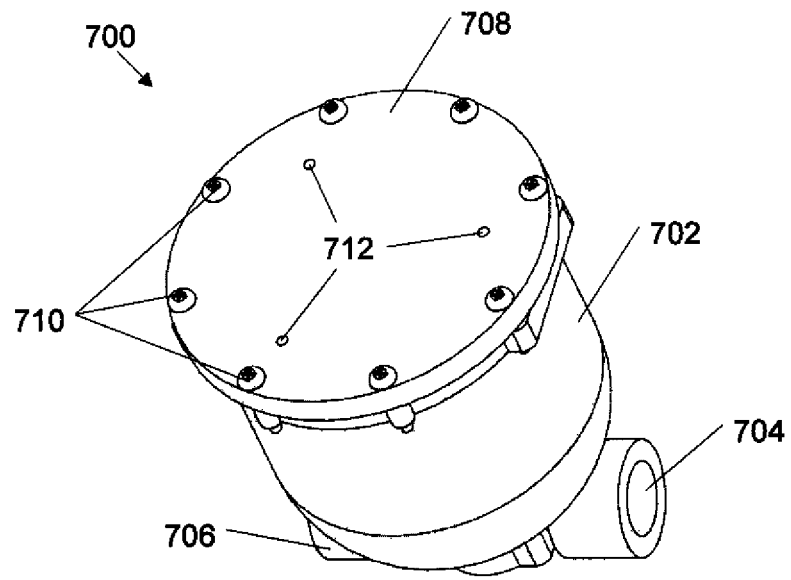
FIG. 7 is a perspective view of a venting system according to one embodiment of the invention.

FIG. 7 illustrates a venting system 700 according to one embodiment of the invention. The venting system can include a housing 702 having a fluid inlet 704 and a liquid outlet 706. A lid 708 can be coupled to the housing 702 using screws 710. In some embodiments, the screws 710 can be evenly distributed along an outer perimeter of the lid 708. In some embodiments, the lid 708 can include one or more gas outlets 712.

Figure 8:
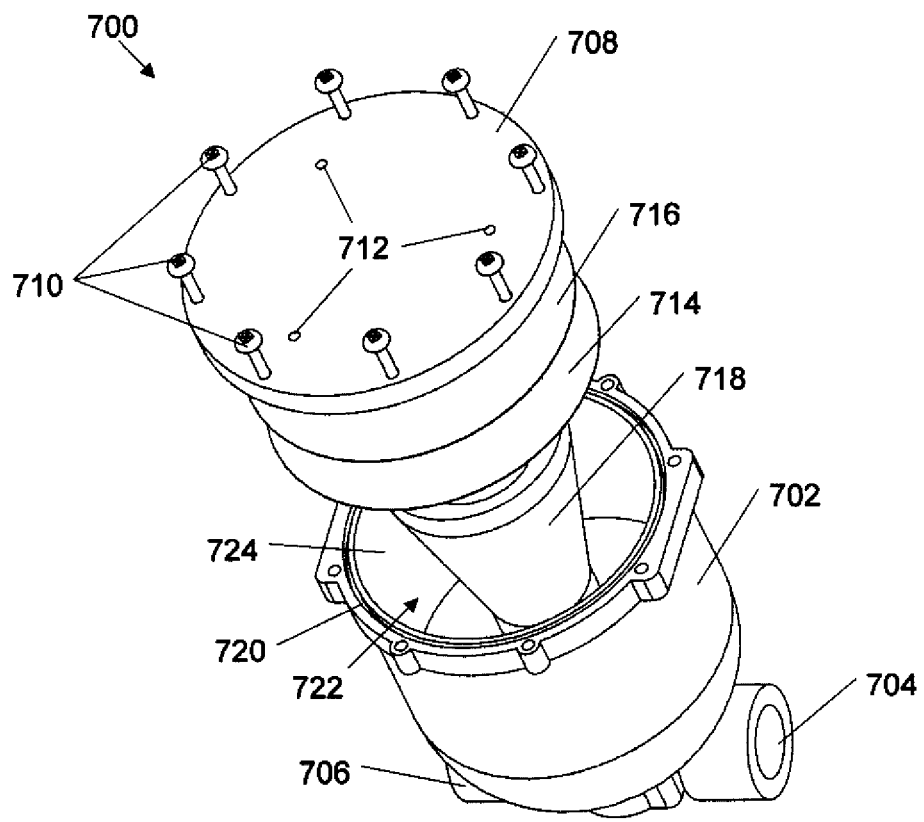
FIG. 8 is an exploded perspective view of the venting system of FIG. 7.

FIG. 8 further illustrates internal components of the venting system 700 according to one embodiment of the invention. The venting system 700 can include a membrane 714, a support layer 716, and a weir 718. The housing 702 can include a groove 720 that engages with the lid 708. In some embodiments, the lid 708 can also engage the membrane 714 and/or the support layer 716 with the groove 720. In some embodiments, the groove 720 can form a pinch seal.

The weir 718 can be positioned in a reservoir 722 of the housing 702. In some embodiments, the housing 702 can include an inner wall 724, which can enclose the reservoir 722. The fluid inlet 704 and the liquid outlet 706 can be in fluid communication with the reservoir 722.

Figure 9:
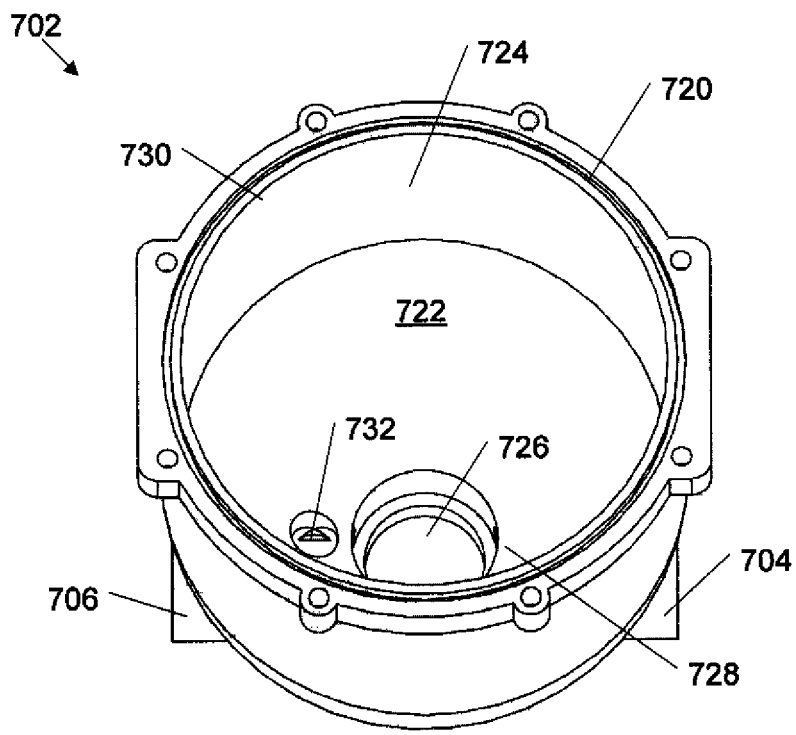
FIG. 9 is a perspective top view of an internal portion of a housing of the venting system of FIG. 7.

FIG. 9 further illustrates the interior of the housing 702. The housing 702 can include a first expansion chamber 726. The inner wall 724 can include a lower end 728 and an upper end 730. The inner wall 724 can be curved. The inner wall 724 can be curved adjacent to the lower end 728 and can be substantially straight adjacent to the upper end 730. The groove 720 can be positioned adjacent to the upper end 730. The first expansion chamber 726 can be positioned adjacent to the lower end 728. The first expansion chamber 726 can be in fluid communication with the fluid inlet 704 and the reservoir 722. The first expansion chamber 726 can be centrally positioned with respect to the reservoir 722. An aperture 732 can enable fluid communication between the reservoir 722 and the liquid outlet 706. The aperture 732 can be located near the bottom end 728. The aperture 732 can be positioned adjacent to the first expansion chamber 726.

Figure 10:
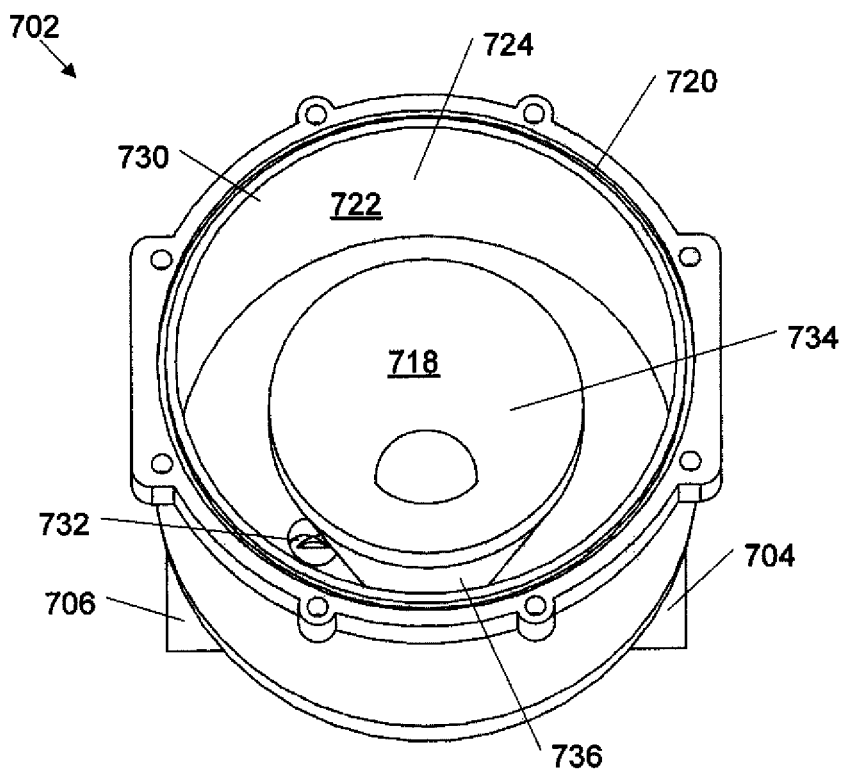
FIG. 10 is a perspective top view of the internal portion of the housing of FIG. 9 with a weir installed according to one embodiment of the invention.

FIG. 10 illustrates the weir 718 positioned in the housing 702. The weir 718 can be in fluid communication with the fluid inlet 704. The weir 718 can include an inner surface 734 and an outer surface 736. The inner surface 734 and/or the outer surface 736 can be curved. The weir 718 can be centrally positioned in the reservoir 722. The aperture 732 can be positioned adjacent to the outer surface 736. The fluid entering the weir 718 through the fluid inlet 704 can overflow the weir 718 into the reservoir 722. The inner wall 724 and/or the outer surface 736 can help direct the fluid in the reservoir 722 toward the aperture 732 and into the liquid outlet 706.

Figure 11:
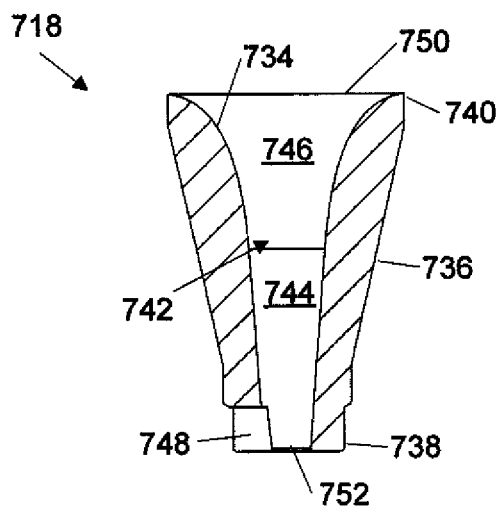
FIG. 11 is a cross-sectional view of a weir of the venting system according to one embodiment of the invention.

FIG. 11 is a cross-sectional view of the weir 718. The weir 718 can include the inner surface 734, the outer surface 736, a lower end 738, and an upper end 740. The inner surface 734 can enclose a channel 742, which can include a first section 744 and a second section 746. In some embodiments, the first section 744 can be positioned adjacent to the lower end 738, and the second section 746 can be positioned adjacent to the upper end 740. In some embodiments, the first section 744 can include a cylindrical shape, while in other embodiments, the first section 744 can include a conical shape. In some embodiments, the second section 746 can be curved. In one embodiment, the second section 746 can be a diffuser.

Figure 12:
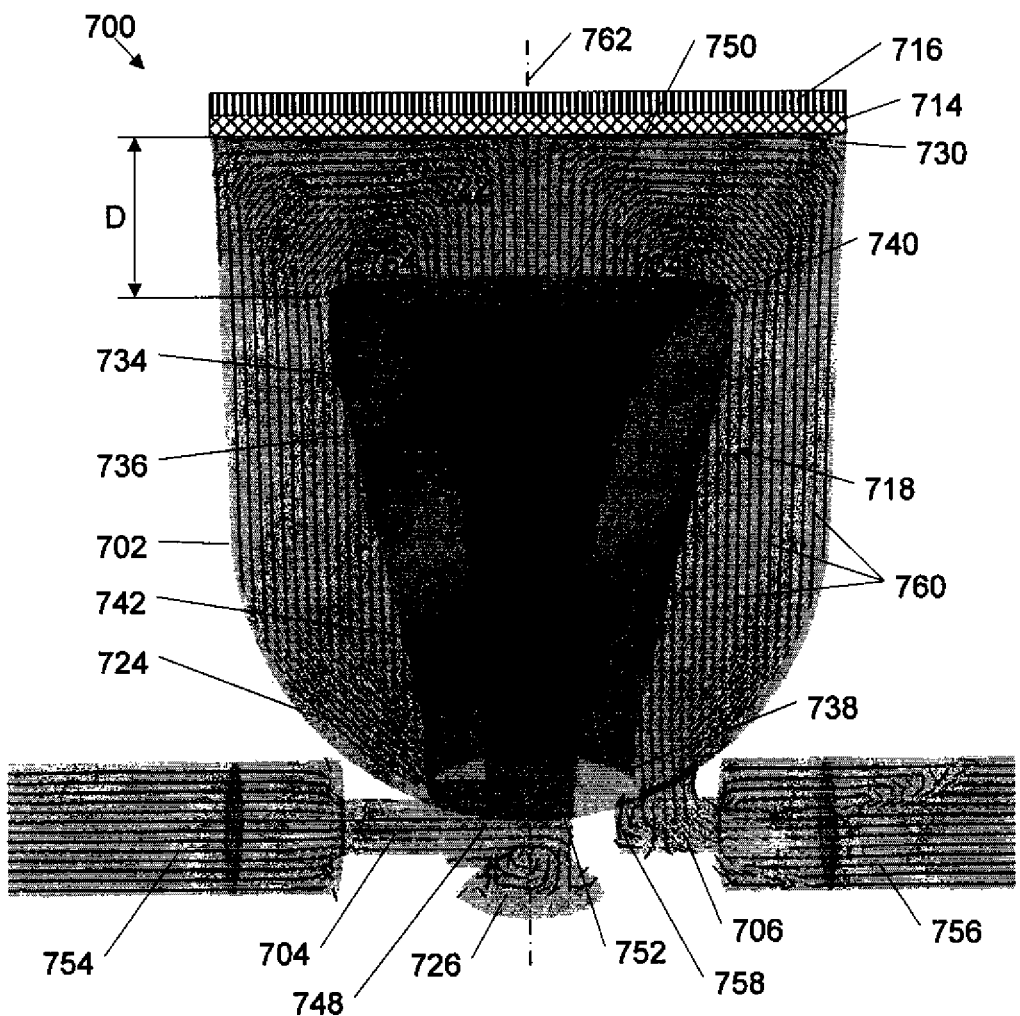
FIG. 12 is a velocity vector plot of fluid flow paths through the venting system of FIG. 7.

As shown in FIG. 11, the weir 718 can include an inflow 748, an outflow 750, and a passageway 752. As shown in FIG. 12, the inflow 748 can be in fluid communication with the fluid inlet 704 and the channel 742. The outflow 750 can be in fluid communication with the channel 742 and the reservoir 722. The passageway 752 can enable fluid communication of the channel 742 with the first expansion chamber 726. In some embodiments, the inflow 748 and/or the passageway 752 can be positioned adjacent to the lower end 738 of the weir 718 while the second section 746 of the weir 718 can be positioned at the upper end 740. In some embodiments, the inflow 748 can be substantially perpendicular to the channel 742 and/or the passageway 752.

FIG. 12 is a velocity vector plot illustrating a flow path through the venting system 700 as shown in FIGS. 7-11. A first conduit 754 can be in fluid communication with the fluid inlet 704. The first conduit 754 can have a larger cross-sectional area than the fluid inlet 704. The fluid inlet 704 can enable fluid communication between the first conduit 754 and the lower end 738 of the weir 718. A second conduit 756 can be coupled to the liquid outlet 706. In some embodiments, the liquid outlet 706 can include a second expansion chamber 758.

In some embodiments, the upper end 740 of the weir 718 can be positioned a distance D away from the membrane 714. In some embodiments, a shape of the weir 718 and/or the distance D can support an even flow distribution along the membrane 714, as indicated by velocity vectors 760. The weir 718 can help provide a balanced wetting of the membrane 714. The fluid flow along the weir 718 and across the membrane 714 can be substantially symmetric to an axis 762. The fluid flow through the venting system 700 can be substantially laminar. The weir 716 can help reduce the number of vortices 764 within the fluid flow. In some embodiments, only a single ring vortex 764 in the vicinity of the upper end 740 is generally present in the reservoir 722. The distance D can be chosen in accordance with a size of the vortex 764. In some embodiments, the inner surface 734, the outer surface 736, and/or the inner wall 724 can be designed to help provide optimized gas separation from the fluid and/or an increase flow rate of the separated gas toward the membrane 714.

In some embodiments, the venting system 700 can include a "first-in, first-out" (FIFO) flow configuration. The weir 718 can be designed in such a way that fluid particles entering the venting system 700 through the fluid inlet 704 can reach the liquid outlet 706 before subsequent fluid particles can reach the liquid outlet 706. Fluid particles already located within the venting system 700 can exit the venting system 700 before the fluid particles reach the liquid outlet 706. In some embodiments, a first fluid can be supplied to the venting system 700 for a first period of time. After the first period of time has elapsed, a second fluid can be supplied to the venting system 700 for a second period of time. The FIFO flow configuration can eliminate the necessity to flush the venting system 700 before the second fluid is supplied. For example, if the venting system 700 is used to separate air from a syrup used in a fountain drink dispenser, the venting system 700 can allow switching of flavors of the syrup. If a first syrup supplied to the venting system 700 is to be switched to a second syrup (e.g., for promotions, flavor of the month, market trends, etc.), the second syrup can substantially push out the first syrup from the venting system 700. A transition time before only traces of the first syrup can be detected in the second syrup can be minimized without having to flush the venting system 700.

In applications involving viscous fluids, such as syrup, ketchup, and other food products, some embodiments of the invention can provide efficient separation and/or ventilation of a gas extracted from the viscous fluids without substantially affecting the efficiency of the membrane 202, 314, 414, 514, 614, 714 over prolonged periods of time. In some embodiments, pumps, vacuums, and/or other measures may not be necessary to separate the gas from the fluid.

In some embodiments, the venting system 200, 300, 400, 500, 600, 700 can be used in liquid supply systems. The liquid supply systems can include, for example, mixing systems and food processing systems. The venting system 200, 300, 400, 500, 600, 700 can be used to remove gases from a fluid before entering the liquid supply system. For example, if the fluid is a viscous food product, like ketchup, honey, and molasses, entrapped air can cause the viscous food product to splatter when dispensed. The venting system 200, 300, 400, 500, 600, 700 can substantially remove the entrapped air and can prevent the viscous food product from splattering. As a result, the venting system 200, 300, 400, 500, 600, 700 not only ensures delivery of precise quantities of the viscous food product, but also reduces the need to clean splattered food product. In some embodiments, the venting system 200, 300, 400, 500, 600, 700 can reduce the risk of damage to the liquid supply system caused by entrapped gas. For example, if the viscous food product is being pumped, entrapped air can cause sudden accelerations and decelerations within the pump, increasing mechanical stress on the pump.

Certain kinds of fluids are often transported in "bag-in-box" (BIB) units. According to some embodiments, the BIB unit can include a plastic bag enclosed by a cardboard box. The plastic bag, when holding the fluid, can easily deform. To give the plastic bag structural integrity, the cardboard box can prevent the plastic bag from deforming beyond an intended shape. Typically, liquids and air are mixed inside the plastic bag. When the plastic bag moves with respect to the cardboard box, an increased amount of air can get entrapped within the liquid inside the BIB unit. The venting system 200, 300, 400, 500, 600, 700 can be suitable for removing the increased amount of entrapped air from the fluid of the BIB unit. In some embodiments, the venting system 200, 300, 400, 500, 600, 700 can help ensure the delivery of accurate flow quantities from the BIB unit. For example, if a BIB unit holding a syrup is coupled to a fountain drink dispenser, the venting system 200, 300, 400, 500, 600, 700 can help ensure that substantially equal amounts of syrup are being dispensed for each drink. As a result, the venting system 200, 300, 400, 500, 600, 700 can help ensure that one drink tastes the same as the next.

In some embodiments, the venting system 200, 300, 400, 500, 600, 700 can be used to extract a gas from mineral oils, synthetic oils, and/or other hydrocarbons. In some embodiments, the venting system 200, 300, 400, 500, 600, 700 can be used to remove entrapped air from motor oils, gear oils, and automatic transmission fluids. The motor oils, gear oils, and transmission fluids can be transported to service facilities in containers and/or BIB units. In order to avoid spillage when the motor oils, gear oils, and automatic transmission fluids are being handled, the containers are not generally completely filled, allowing air to get trapped within those fluids. These fluids may also be transported in BIB units, with the same entrapped air issues as liquid food products. The entrapped air can result in erroneous flow quantity readings when the motor oils, gear oils, and automatic transmission fluids are being dispensed. The resulting uncertainty of a correct fill level can result in a technician having to check the fluid level and, possibly, top-off the motor oils, gear oils, and automatic transmission fluids until the correct fill level is reached. The venting systems 200, 300, 400, 500, 600, 700 can reduce the air content of the motor oils, gear oils, and automatic transmission fluids, eliminating the need to correct the fill levels.

In some embodiments of the invention, plug flow-like characteristics (e.g., a cross-sectional flow profile of close to a uniform velocity distribution) can be achieved. Other configurations can be employed to effectively reduce fluid jets, vortices, dead regions and/or otherwise facilitate the separation of entrapped gas from the fluid and/or the ventilation of the separated gas from the venting systems 200, 300, 400, 500, 600, and 700.

The term "non-porous" as used herein and in the appended claim generally refers to a material which may be free of pores or voids, or may have pores or voids that are not in fluid communication from one side of the membrane 26, 126, 202, 314, 414, 514, 614, 714 to the other, and which is a barrier to convective flow of liquids or gases. While a material such as the material used in construction of the membrane 26, 126, 202, 314, 414, 514, 614, 714 according to some embodiments of the invention may be non-porous, it may still be "permeable" to liquids or gases. The term "permeable" (and conversely "impermeable") as used herein and in the appended claims generally describes the property of a material to allow a particular species, such as a gas or a liquid, to transport therethrough (or conversely, impede transport therethrough). The term "permeable" generally describes the overall property of mass transfer by diffusion at a molecular level, and in no way is any particular scientific mechanism by which this occurs implied.

In some embodiments, the membrane 26, 126, 202, 314, 414, 514, 614, 714 can include two or more layers of various or similar characteristics. In some embodiments, the membrane 26, 126, 202, 314, 414, 514, 614, 714 can include a support layer to provide the membrane 26, 126, 202, 314, 414, 514, 614, 714 with suitable rigidity. The membrane 26, 126, 202, 314, 414, 514, 614, 714 can further include independent additional membranes and/or support layers, including porous, microporous and non-porous layers. In some embodiments, the membrane 26, 126, 202, 314, 414, 514, 614, 714 can include a combination of suitable materials.

The membrane 26, 126, 202, 314, 414, 514, 614, 714 of some embodiments can be made of a variety of materials, such as hydrophobic and/or chemically inert materials, which can be resistant to being wetted by liquids, such as low surface energy liquids, solvents, oils, surfactants, proteins, carbohydrates, or mixtures thereof. For example, the membrane 26, 126, 202, 314, 414, 514, 614, 714 can be constructed of porous thermoplastic fluoropolymers, such as tetrafluoroethylene-hexafluoropropylene copolymer (FEP), tetrafluoroethylene-(perfluoroalkyl) vinyl ether copolymer (PFA), or amorphous fluoropolymers. In some embodiments, the membrane 26, 126, 202, 314, 414, 514, 614, 714 can include thermoformed films.

In some embodiments, the membrane 26, 126, 202, 314, 414, 514, 614, 714 can be a thermoset polymer. The membrane 26, 126, 202, 314, 414, 514, 614, 714 can include a plurality of highly cross-linked polymers. As a result, the membrane 26, 126, 202, 314, 414, 514, 614, 714 can include multiple, three-dimensional bonds between different polymers. In some embodiments, the thermoset polymer can result in a more rigid membrane 26, 126, 202, 314, 414, 514, 614, 714, which can possibly result in a reduction and/or elimination of the support layer.

The membrane 26, 126, 202, 314, 414, 514, 614, 714 can include polymeric organosilicone compounds. In some embodiments, the membrane 26, 126, 202, 314, 414, 514, 614, 714 can be made from a silicone derived from polydimethylsiloxane and/or a fluorosilicone derived from fluorovinylmethylsilicone. The membrane 26, 126, 202, 314, 414, 514, 614, 714 can include vinyl or other functionalities to alter certain properties of the membrane 26, 126, 202, 314, 414, 514, 614, 714.

In some embodiments, the membrane 26, 126, 202, 314, 414, 514, 614, 714 can be made from ethyl cellulose, polyethylene, and polypropylene materials. In other embodiments, the membrane 26, 126, 202, 314, 414, 514, 614, 714 can be made from polyimides, nitrate butadiene rubber (NBR), polyurethanes, and/or amorphous fluoropolymers. More specifically, the membrane 26, 126, 202, 314, 414, 514, 614, 714 of some embodiments can include polyisoprene (Natural Rubber), poly(4-methyl-1-pentene), polydimethylsiloxane, polyvinylmethylsiloxane, polyphenylvinylmethylsiloxane, polyoctenamer, and/or nitrile rubber.

Various characteristics of the membrane 26, 126, 202, 314, 414, 514, 614, 714 (e.g., shape, surface area, and thickness) can influence its properties, such as gas permeation rate, strength, and durability. The desired functionality can be achieved through optimization, compromise, and/or trade-off between properties and/or materials.

It will be appreciated by those skilled in the art that while the invention has been described above in connection with particular embodiments and examples, the invention is not necessarily so limited, and that numerous other embodiments, examples, uses, modifications and departures from the embodiments, examples and uses are intended to be encompassed by the claims attached hereto. The entire disclosure of each patent and publication cited herein is incorporated by reference, as if each such patent or publication were individually incorporated by reference herein. Various features and advantages of the invention are set forth in the following claims.

The invention claimed is:

1. A passive venting system that vents gas from one of liquid food product and drinking water entrained with gas, the venting system comprising:
   a housing including a reservoir, the reservoir including a fluid inlet, a gas outlet, and a liquid outlet; and
   a single non-porous membrane in fluid communication with the reservoir and the gas outlet, the non-porous membrane being permeable to the gas and substantially impermeable to the one of liquid food product and drinking water;
   the single non-porous membrane being positioned adjacent to an upper portion of the housing.

2. The venting system of claim 1, wherein the reservoir provides a tortuous flow path for the liquid.

3. The venting system of claim 2, wherein the reservoir includes at least one baffle to create the tortuous flow path.

4. The venting system of claim 1, wherein the non-porous membrane is coupled to the housing with a pinch seal.

5. The venting system of claim 1, wherein the non-porous membrane is constructed of at least a thermoset polymer.

6. The venting system of claim 1, wherein the non-porous membrane is constructed of at least a silicone.

7. The venting system of claim 1, wherein at least one of the housing and the reservoir is constructed as part of at least one of a liquid pumping system, a liquid transport system, and a liquid storage system.

8. The venting system of claim 1, wherein the upper portion of the housing includes at least one outlet, and wherein the single non-porous membrane is positioned adjacent to the at least one outlet.

\* \* \* \* \*